United States Patent [19]
Prasse

[11] 3,814,409
[45] June 4, 1974

[54] PREPOSITIONED AND GAP ALIGNED SPLIT PISTON RING ASSEMBLIES

[75] Inventor: Herbert F. Prasse, Town and Country, Mo.

[73] Assignee: Ramsey Corporation, St. Louis, Mo.

[22] Filed: May 10, 1971

[21] Appl. No.: 141,612

[52] U.S. Cl. .................. 267/1.5, 277/9.5, 277/140
[51] Int. Cl. ............................................. F16f 1/34
[58] Field of Search ............ 277/9.5, 138, 140, 146, 277/155, 220; 267/1.5

[56] References Cited
UNITED STATES PATENTS
| | | | |
|---|---|---|---|
| 2,778,697 | 1/1957 | Nuttall | 267/1.5 |
| 3,472,521 | 10/1969 | Nisper et al. | 277/140 |
| 3,601,415 | 8/1971 | Bond et al. | 277/9.5 X |

*Primary Examiner*—Meyer Perlin
*Assistant Examiner*—Ronald C. Capossela
*Attorney, Agent, or Firm*—Hill, Sherman, Meroni, Gross & Simpson

[57] ABSTRACT

A split piston ring assembly incorporates a combined end alignment and gap spacing device for use with an expander-spacer split piston ring of the assembly for prepositioning the ends of the ring prior to and during assembly of the ring on a piston and for guiding the ends into aligned abutment when the ring is seated in a piston ring groove. The device includes a member having a cross sectional area sized to be telescopically received in a circumferential channel in the expander-spacer ring and includes means cooperating with wall segments forming the channel to retain the ends in a spaced-apart relationship against inherent resilient forces tending to move the ring ends together and to permit relative telescopic movement between the member and the ring when a greater force is applied to close the gap and seat the ring in the piston ring groove.

3 Claims, 13 Drawing Figures

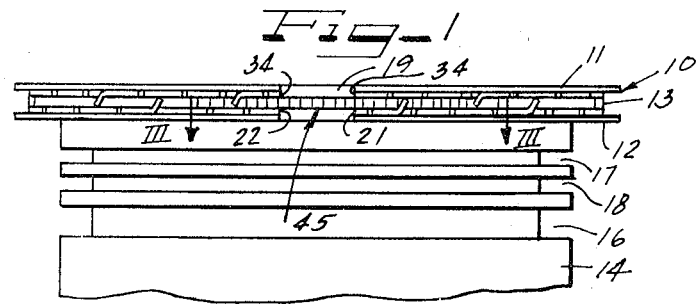
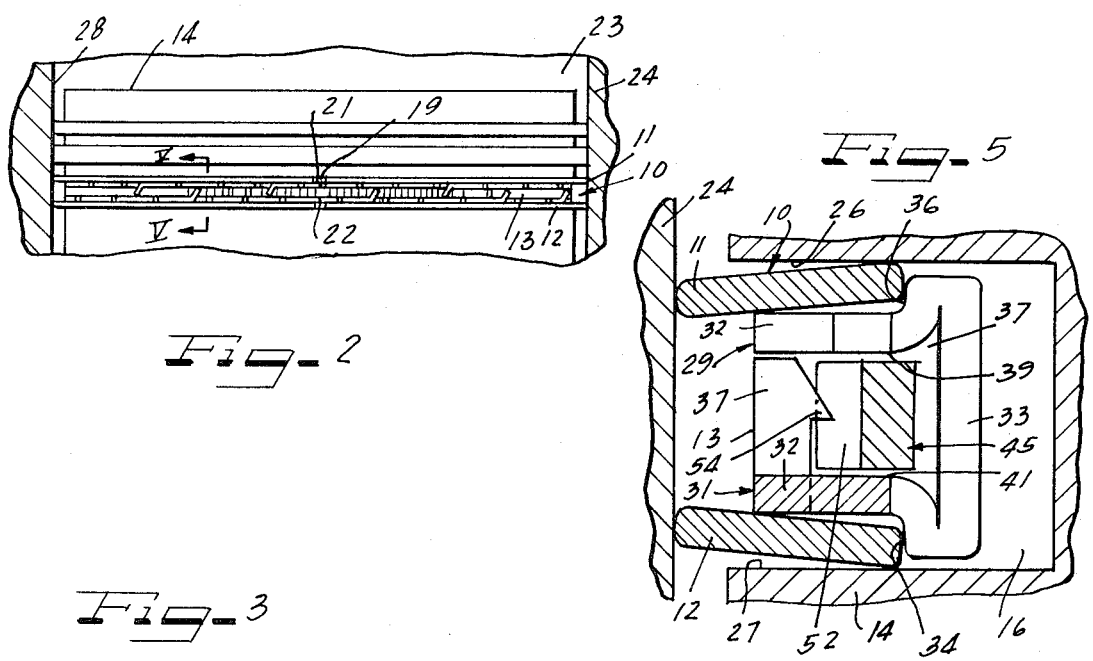
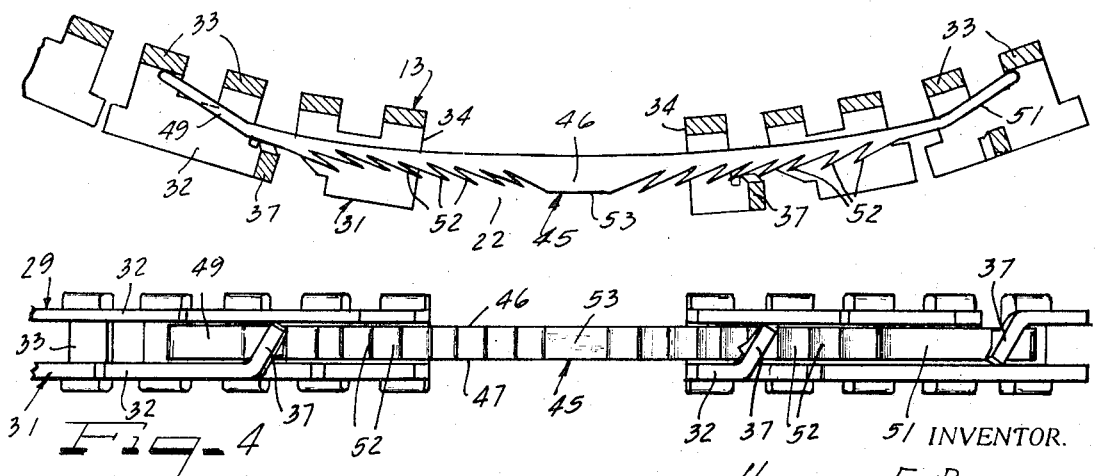

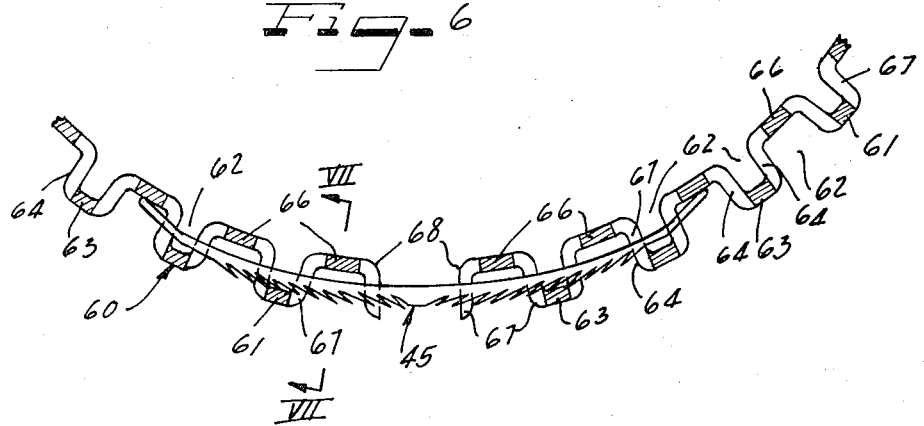
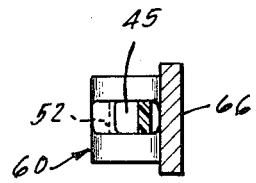
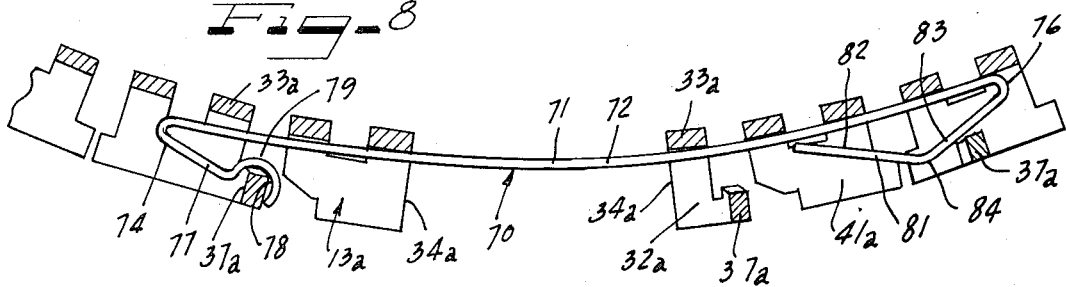
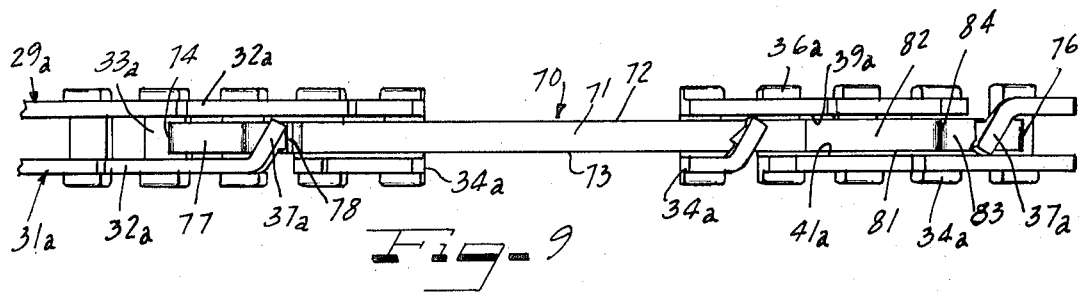
INVENTOR.
HERBERT F. PRASSE

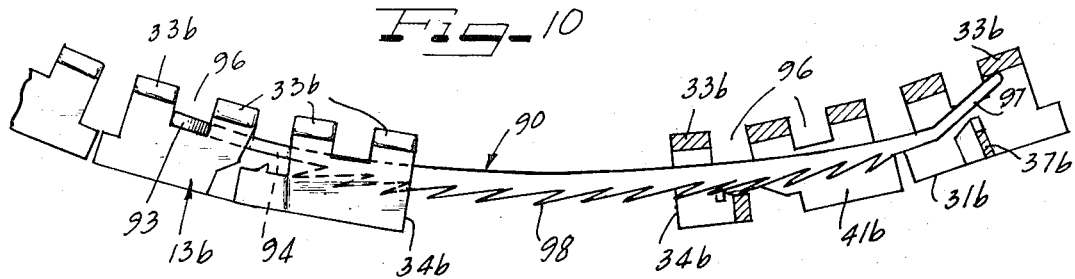
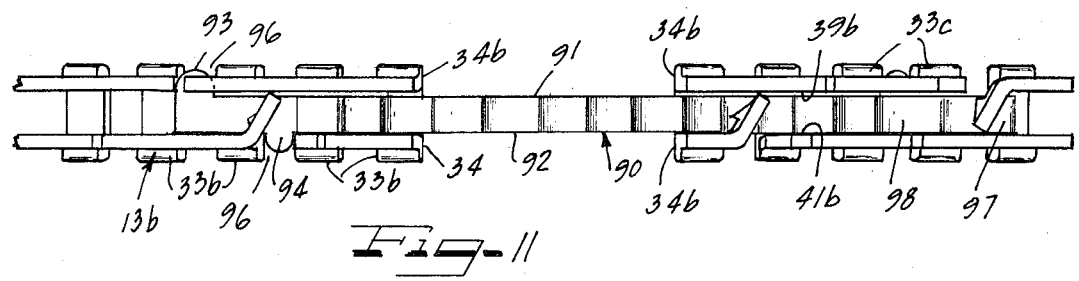
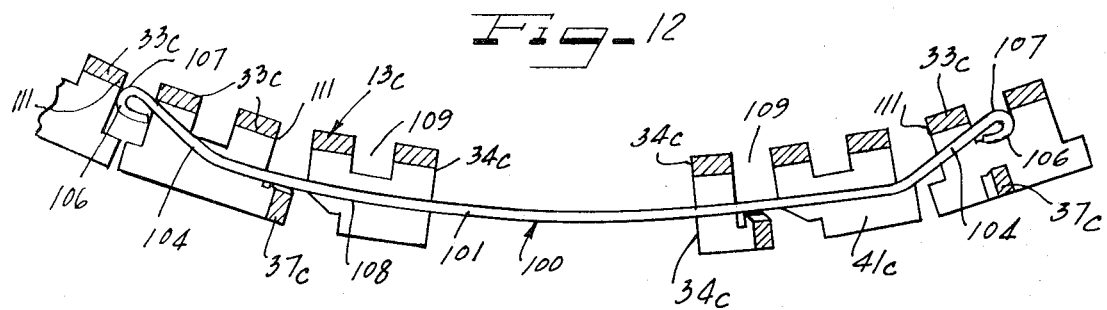
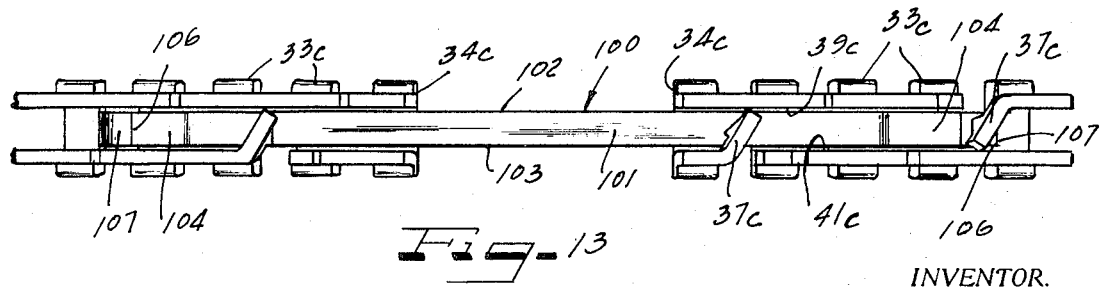

PREPOSITIONED AND GAP ALIGNED SPLIT PISTON RING ASSEMBLIES

BACKGROUND OF THE INVENTION

1. Field of the Invention

The present invention generally relates to piston rings and piston ring assemblies and more particularly relates to an accessory for use with split piston rings of the expander-spacer type, wherein the accessory retains the ring in its expanded position during assembly and guides the ends of the ring into proper alignment when assembled to facilitate the assembly of the ring in a ring groove with the ends in aligned abutment.

2. Description of the Prior Art

A piston oil ring assembly generally comprises one or more thin rail rings and an expander-spacer ring. The split, expander-spacer ring is assembled on a piston, such as a reciprocally mounted piston of an internal combustion engine, by spreading the ends thereof, slipping the ring axially over the piston to a position in substantial radial alignment with a ring groove and then closing the ring to seat the same in the groove. The rail rings are then installed and generally include a pair of rings disposed on axially opposite sides of the expander-spacer ring, which supports the rail rings in a spaced relationship.

In the event the ends of the expander-spacer ring are not in substantial alignment, when the rail rings are installed, the oil ring assembly may not serve its intended purpose, thereby resulting in engine failure, or the misaligned ends may interfere with the proper installation of the rail rings.

Also, the expander-spacer rings are manufactured to have an inherent elasticity or resiliency urging the ends of the ring into abutment. During the installation of the ring on a piston, the ends must be retained in a spread or spaced-apart realtionship against those inherent resilient forces.

Heretofore, an accessory for use with expander-spacer type piston rings has not been provided which both retains the ring in an expanded or opened position while the ring is being placed over the piston and guides the ends of the ring into aligned abutment as the ring is seated into the piston ring groove.

SUMMARY OF THE INVENTION

In accordance with the present invention, a split piston ring of the expander-spacer type is provided with a combined end alignement and spacer accessory or member which selectively retains the ends of the ring in a spaced-apart relationship against inherent resilient forces tending to close the gap between the ends and which guides the ends into alignment as the gap is closed to seat the ring in a piston ring groove.

Most oil control piston ring assemblies include a flexible, split expander-spacer ring rolled to its cross-sectional shape from a thin ribbon of metal and formed with a circumferentially extending channel. The circumferential channel of the ring is generally formed by an inner wall portion and an outer wall portion radially spaced from the inner wall portion, with each of the wall portions including a series of circumferentially spaced wall segments having slots or gaps formed therebetween. The ring may also include an upper and a lower, axially spaced-apart series of wall segments.

In accordance with the present invention, the combined end alignemnt and spacer member, which is entirely contained within the cross sectional silhouette of the split ring, has a cross sectional configuration sized and shaped to enable the member to be telescopically received in the ring channel and to hold the ends of the ring in axial alignment.

At least one end portion of the aligner-spacer member has means formed thereon and cooperating with the wall segments forming the channel, or gaps formed between the wall segments, to retain the ring in its opened or expanded position against circumferential forces generated by the inherent resiliency of the split ring and to permit the aligner-spacer element to telescopically slide into the ring channel when a force greater than the inherent resilient forces is applied to close the ring for seating the same in a piston ring groove.

It is therefor an important object of the present invention to provide an accessory for use with split piston rings of the expander-spacer type, wherein the accessory holds the split ring in an expanded position during installation of the ring over a piston and guides the ends of the ring into alignment to facilitate the seating of the ring in a ring groove with the ends thereof in aligned abutment.

Another object of this invention is to provide a rod-like or strip-form member for use with an expander-spacer split ring having a circumferentially extending channel, wherein the member is sized and configured to be telescopically received in the channel to guide the ends of the ring into aligned abutment as the ring is seated in a piston groove and includes means for retaining the split ring in an opened or expanded position during assembly over a piston head.

BRIEF DESCRIPTION OF THE DRAWINGS

FIG. 1 is an elevational view of a piston head shown with an oil control piston ring assembly in an expanded position as the same is being assembled over the piston head;

FIG. 2 is a cross sectional view of a cylinder block of an internal combustion engine and illustrates a partial view of a piston head in elevation with an oil control piston ring assembly embodying the features of the present invention installed thereon;

FIG. 3 is an enlarged cross sectional view taken substantially along line III—III of FIG. 1 and illustrates the aligner-spacer member of the present invention installed within an expander-spacer split ring shown in an expanded position;

FIG. 4 is an enlarged elevational view illustrating the aligner-spacer member of the present invention installed in an expander-spacer split ring;

FIG. 5 is a fragmental, enlarged cross sectional view taken substantially along the line V—V of FIG. 2 and illustrates the oil control ring assembly in a ring groove of a piston which is reciprocally disposed within a cylinder.

FIG. 6 is an enlarged, fragmental cross sectional view, similar to FIG. 3 and illustrating one form of the aligner-spacer member of the present invention installed in an expander-spacer split ring of a configuration different from that illustrated in FIGS. 1 through 5, inclusive.

FIG. 7 is a cross sectional view taken substantially along lines VII-VII of FIG. 6;

FIG. 8 is an enlarged, fragmental, cross sectional view similar to FIG. 3 and illustrates a second embodiment of the aligner-spacer member of the present invention installed in a split piston ring of the type illustrated in FIGS. 1 through 5, inclusive.

FIG. 9 is an enlarged, fragmental elevational view of the split ring and aligner-space member shown in FIG. 8;

FIG. 10 is an enlarged, fragmental, cross sectional view similar to FIG. 3 and illustrating a third embodiment of the aligner-spacer member of the present invention installed in a split ring of the type shown in FIGS. 1 through 5, inclusive;

FIG. 11 is an enlarged, fragmental, elevational view of the split ring and aligner-spacer member shown in FIG. 10;

FIG. 12 is an enlarged, fragmental, cross sectional view similar to FIG. 3 and illustrating a fourth embodiment of the aligner-spacer member of the present invention installed in a split ring of the type shown in FIGS. 1 through 5, inclusive; and FIG. 13 is an enlarged, fragmental, elevational view of the aligner spacer member and split ring shown in FIG. 12.

DETAILED DESCRIPTION OF CERTAIN PREFERRED EMBODIMENTS

Referring to the drawings, and first specifically referring to FIGS. 1 through 5, inclusive, an oil-control piston ring assembly 10 includes a to thin, split rail ring 11, an identical bottom rail ring 12 and an intermediate, combination circumferential expander and spacer ring 13. When assembled on a piston such as the piston 14 of a conventional type used in internal combustion engines, the ring assembly 10 is seated in an oil ring groove 16. The piston also includes a top groove 17 for receiving a conventional split compression or fire piston ring and a middle groove 18 for receiving a conventional split compression ring.

As illustrated in FIG. 1, each of the rail rings 11 and 12 has a radial gap or split 19 and 21, respectively, which allows the ring to be circumferentially expanded during assembly over the piston 14. The expander-spacer ring 13 also has a radial split or gap 22 permitting the ring to be expanded during assembly. With the expander-spacer ring 13 held in its opened or expanded position, the ring is axially slipped over the piston 14 to a position in alignment with the oil ring groove 16. When in alignment with the oil ring groove, the ring 13 is seated in the groove by closing the gap 22. Subsequently, the rail rings 11 and 12 are inserted in the ring groove 16 on axially opposite sides of the expander spacer ring 13. Once the oil control ring assembly 10 and the compression rings are properly seated in their respective grooves, the piston is assembled into a cylinder 23 of a cylinder block 24 of an internal combustion engine.

The expander-spacer ring 13 resiliently urges the thin rail rings 11 and 12 into sealing engagement with the upper and lower, radially extending surfaces 26 and 27 of the ring groove 16. At the same time, the expander-spacer ring 13 urges the thin rail members 11 and 12 into sealing engagement against the cylindrical surface 28 of the cylinder 23.

One form of the expander-spacer ring, as illustrated in FIGS. 1 through 5, inclusive, consists of a ring formed of a ribbon of thin metal and has two axially spaced rows 29 and 31 of circumferentially spaced leg segments 32 which are integrally connected along their inner peripheries to axially upright cross bars 33. The upright cross bars 33 are spaced circumferentially around the inner periphery of the expander-spacer ring 13 and connect the leg segments of the axially spaced rows 29 and 31 in staggered relation with each leg segment 32 in one row having two cross bars integrally connected with it while each of those cross bars is integrally connected with one of two adjacent leg segments in the other row, thus leaving the material in the expander-spacer ring continuous through a zig-zag pattern through the circumference except at the ends 34, 34 which are abutted together when the expander-spacer ring is seated in the groove 16. The rail rings 11 and 12 are supported and axially separated by the rows 29 and 31 of the leg segments 32. An inner periphery of the rail rings 11 and 12 abut abutment shoulders 35 and 36 formed at upper and lower margins of the cross bars 33 and extending axially beyond the planes of the rows 29 and 31 of the leg segments 32.

To prevent the rail rings 11 and 12 from entering the U-shaped channel formed by the axially spaced rows 29 and 31 of the wall segments 32 and the cross bars 33, end portions or tabs 37 of the legs or wall segments 32 are axially offset in directions to span the channel and thus block entry thereinto by the rail rings. Additional details of the expander-spacer ring 13 are described in Schmidt et al U. S. Pat. No. 3,460,846, assigned to the assignee of this invention.

The axially offset tabs 37 of the wall segments 32 cooperate with the cross bars 33 to form radially spaced, axially extending, discontinuance wall portions defining a circumferential channel or opening 38 opening at the opposite ends 34, 34 of the ring 13. Inwardly projecting, planar surfaces 39 and 41 formed respectively on the upper row 29 and the lower row 31 of the wall segements 32 form axially spaced, discontinuance surfaces extending circumferentially of the ring and radially between the cross bars 33 and the axially offset tabs 37. Accordingly, the circumferentially extending channel 38 has a generally rectangular configuration in transverse cross section and includes axially spaced wall portions and radially spaced wall portions.

In accordance with the principles of the present invention, the ring assembly 10 also includes an accessory 45 contained within the cross sectional silhouette of the expander-spacer ring 13 for prepositioning the ends of the ring prior to and during assembly thereof onto the piston 14 and for guiding the ends 34, 34 into aligned abutment when the ring is seated in the piston ring groove 16.

The accessory or end alignment and gap spacing device 45 consists of a member having a cross sectional area sized to be telescopically received in the circumferential channel 38 and includes means cooperating with the radially spaced wall segments of the channel to retain the ends 34, 34 in an opened or spaced-apart relationship, against inherent resilient forces tending to close the ring gap 22, and to permit relative telescopic movement between the device 45 and the ring 13 when a force greater than the inherent resilient forces in the ring is applied to close the gap and seat the ring in the piston ring groove 16. Accordingly, the expander-spacer ring 13 is held in the opened or expanded position during assembly and once seated in the ring groove, the ends are disposed in aligned abutment to assure proper placement of the rail rings 11 and 12 on axially opposite sides of the ring 13 and to prevent the ends 34, 34 from overlapping during assembly of the piston 14 into the cylinder 28.

In the embodiment illustrated in FIGS. 1 through 5, inclusive, the device or accessory 45 consists of an elongated bar member composed of a resilient material, such as nylon, and curved lengthwise to the general curvature of the ring 13. The resilient member 45 has a generally rectangular configuration in transverse cross section and is characterized by upper and lower surfaces 46 and 47 spaced-apart a distance to be closely received between the axially spaced surfaces 39 and 41 of the channel 38, thereby to axially align the ends 34, 34 of the split ring 13.

To selectively retain the ring ends 34, 34 in the expanded position, the member 45 has resilient, opposite end portions 49 and 51 radially inwardly offset. The resilient, offset end portions or spring arms 49 and 51 engage the circumferentially spaced cross bars 33 to radially outwardly urge the member 45 against the axial tabs 37. Serrations 52 formed on a radially outwardly projecting face of the member 45 engage with the tabs 37, thereby to retard relative movement between the device 45 and the ring 13. The serrations 52 disposed on opposite sides of a medial segment 53 of the member 45 slant in circumferentially opposite directions and toward the medial segment.

The frictional retarding force providing by the coaction between the serrations 52 and the tabs 37, which are urged together by the resilient end portions or spring arm 49 and 51, is sufficient to retain the ends 34, 34 in a spaced-apart relationship against the inherent circumferential forces caused by the resiliency of the ring 13. However, when a circumferential force greater than the inherent forces is applied to the ring 13, the resilient offset end portions 49 and 51 will flex to permit snap-skip movement of the serrations 52 along the tabs 37. Thus, before assembling the ring 13 on the piston 14, the ends 34, 34 may be apread apart a predetermined distance to preposition the ends so that the ring 13 will slip over the piston 14. Once the ring is in radial alignement with the piston ring groove 16, the gap may be closed by applying a sufficient force to the ring 13 for overcoming the retardation due to the coaction between the serrations 52 and the tabs 37.

If desired, the tabs 37 may include a radially inwardly extending substantially triangular projection 54 disposed to engage between adjacent ones of the serrations 52.

The end alignment and gap spacing accessory member 45 may be utilized with any type of split piston ring having a circumferentially extending channel formed between radially spaced-apart rows of wall segments for coaction with the offset end portions 49 and 51 and the serrations 52 to retard relative telescopic movement and having axially spaced surfaces for cooperation with the side surfaces 46 and 47 to guide the ends into aligned abutment.

As illustrated in FIG. 6, the accessory member 45 is utilized with an expander-spacer split piston ring 60 consisting of a corrugated metal strip formed with alternate nodes or humps 61 and valleys 62. Each of the nodes 61 has a peripheral face or front leg 63 and the side legs 64 diverging radially inwardly from the front leg to back walls or legs 66 forming the bottoms of the valleys 62 between the nodes 61. Each of the side legs 64 is formed with a slot 67 extending between the associated from leg 63 and the bottom leg 66, thereby forming a series of circumferentially aligned slots defining a circumferential channel in the piston ring 60.

With the accessory member 45 received in the circumferential channel formed by the slot 67, the resilient, offset end portions 49 and 51 cooperate with the bottom legs 66 to urge the serrations 52 against the front legs 63. In that manner, relative telescopic movement between the member 45 and the ring 60 is sufficiently retarded to retain the opposed ends 68, 68 of the ring at a selected spacing against any inherent resilient forces of the ring. Also, the slots 67 are sized in axial directions relative to the axial width or spacing between the surfaces 46 and 47 of the member 45 to closely receive the member, thereby to guide the ends into axially aligned abutment when assembled.

It is also contemplated by the present invention to form a one-piece accessory member from a strip of spring steel. As illustrated in FIGS. 8 and 9, a spring steel accessory member 70 may be utilized with an expander-spacer split piston ring 13a, which is identical to that described hereinabove in reference to FIGS. 1 through 5, includsive. Thus, like elements of the ring 13a are identified by the same reference numerals to which an "a" has been added.

The end alignment and gap spacing accessory member 70 consisting of a strip of spring steel or similar material has an elongated body portion 71 curved to the general curvature of the split ring 13a. The body portion 71 has an axial width between side edge surfaces 72 and 73 sized slightly less than the spacing between the radially extending faces 39a and 41a on the axially spaced rows 29a and 31a of the legs 32a. Thus, as the ends 34a, 34a move together, the accessory member 70 guides the ends into axially aligned abutment.

To preposition the ends 34a, 34a during assembly of the ring 13a on a piston, the accessory member 70 has one end portion 74 anchored to the ring 13a and an opposite end portion 76 formed to coact with the circumferentially spaced series of across bars 33a and the offset tabs 37a in a manner to provide a retarding force sufficient to retain the ring ends in a spaced-apart relationship against inherent resilient forces of the piston ring and to permit snap-skip telescopic movement when a greater force is applied to the ring during assembly thereof. As illustrated in the drawings, the anchored end portion 74 is characterized by a reversely bent, spring leg 77 having a radially outwardly opening hook 78 formed by an arcuate ridge 79 at a distal end of the leg. The reversely bent leg 77 is spaced from the body portion 71 in its free state and resiliently urges the hook 78 toward the tabs 37a. Accordingly, when the anchored end portion 74 of the accessory member 70 is telescopically inserted into the channel of the piston ring 13a, the hook 78 will engage the first one of the tabs 37a which it encounters, thereby to anchor that end for preventing further telescopic movement.

The movable end portion 76 of the accessory member 70 includes a reversely bent or overlapped leg 81 characterized by a pair of diverging leg segments 82 and 83 joined at an apex 84, thereby to form a resilient wedge. The apex 84 of the overlapped leg 81 is normally spaced from the body portion 72 by a distance greater than the spacing between the cross bars 33a and the tabs 37a, thereby to form a resilient abutment for coacting with the tabs 37a a retard relative telescopic movement between the member 70 and the split ring 13a and to permit snap-skip movement as the apex 84 is depressed sufficiently to clear successive ones of the tabs.

Another embodiment of the present invention, as illustrated in FIGS. 10 and 11, contemplates providing an accessory member 90 having one anchored end and an opposite end formed to execute a snap-skip telescoping movement relative to the piston ring 13b. The piston ring 13b is identical to the piston ring illustrated in FIGS. 1 through 5, inclusive, and thus like elements thereof are identified with the same reference numerals to which a "b" has been added.

The accessory member 90 consists of an elongated strip form member composed of nylon or other suitable material and is curved longitudinally to the general curvature of the expander-spacer ring 13b. Axially spaced side edges 91 and 92 of the member 90 are spaced apart a distance slightly less than the spacing between the opposed surfaces 39b and 41b defining the upper and lower margins of the circumferential channel 38b of the ring 13b. Thus, the member 90 is closely received within the circumferential channel in a manner to guide the ends 34b, 34b of the ring into aligned abutment, in a manner similar to that of the other embodiments described hereinabove.

To anchor one end portion of the member 90, a pair of axially offset tabs 93 and 94 extending in opposite directions and formed on one end portion of the accessory member 90 engage gaps 96 between adjacent ones of the circumferentially spaced legs 32b. The flexibility and resiliency of the accessory member 90 permits the anchored end including the tabs 93 and 94 to be telescopically inserted into the circumferential channel 38b of the ring 13b far enough for the tabs 93 and 94 to interlock into the gaps 96.

In a manner similar to that described hereinabove for the first embodiment of the present invention, the end alignment and gap spacing accessory 90 has a radially inwardly offset, resilient portion or spring arm 97 formed at an end thereof opposite the anchored end. The spring arm or resilient offset end 97 cooperates with the cross bars 33b of the ring 13b for urging a series of serrations 98 into retarding engagement with the offset tabs 37b. Thus, when the ring ends 34b, 34b are spread apart prior to the assembly of the ring on a piston, the coaction between the serrations 98 and the tabs 37b will retain the ends in the expanded position against any inherent resilient forces tending to close the gap between the ends and permitting the gap to be closed when a greater force is applied to seat the ring in the ring groove.

A still further embodiment of the present invention, as illustrated in FIGS. 12 and 13, contemplates providing an end alignment and gap spacing accessory member 100 composed of a strip of resilient material, such as spring steel or the like. The split expander-spacer split ring 13c is identical to that described hereinabove in reference to FIGS. 1 through 5, inclusive, and thus like elements are identified with the same reference numeral to which a "c" has been added.

The end alignement and gap spacing accessory member 100 consists of a resilient strip-form member having a body portion 101 with opposite end portions thereof telescopically received in a circumferential channel of the split ring 13c and spanning a gap between the ends 34c, 34c of the ring. The strip-form body portion 101 has a generally rectangular configuration in transverse cross section and is characterized by upper and lower side edge surfaces 102 and 103 axially spaced apart a distance slightly less than the spacing between the confronting, axially spaced surfaces 39c and 41c defining the upper and lower margins of the circumferential channel 38c. Thus, as the opposed ends 34c, 34c of the ring are moved together to close the gap therebetween, the accessory member 100 guides the ends into axially aligned abutment to assure proper seating of the ring in its ring groove.

Means for retarding relative telescopic movement between the accessory member 100 and the split ring 13c in a manner to preposition the ring for assembly include a spring arm 104 formed at each of the opposite end portions of the accessory member. Each of the spring arms 104 is formed by a resilient end portion or arm radially inwardly offset from the curved body portion 101 at either end thereof. Each of the resilient spring arms 104 has a distal end 106 curled radially outwardly to provide an arcuate abutment surface 107 for coaction with the circumferentially spaced, axially extending cross bars 33c. In operations the resilient legs or spring arms 104 urge a radially outwardly projecting surface 108 of the body portion 100 against the tabs 37c and urge the arcuate abutment surface 107 toward the cross bars 33c and gaps 109 formed between adjacent ones of the cross bars. The curled distal ends 106 of the spring arms 104 slightly enter the gaps 109 with the curved abutment surface 107 engaging a corner 111 of one of the cross bars 33c to retard relative telescoping movement between the accessory member 100 and the ring 13c for retaining the ends 34c, 34c in the expanded position. As the ring is seated, a force greater than the inherent resilient forces of the ring is applied thereto, thereby causing the curled distal ends 106 to flex outwardly and snap-skip along the cross bars 33c until the ends 34c are guided into aligned abutment.

From the foregoing description, it will be noted that the present invention contemplates providing an accessory member for use with expander-spacer split piston rings of the type having a circumferentially extending channel formed therein between the radially wall segments and axially spaced wall segments. The accessory member has a cross sectional area sized relative to the circumferentially extending channel to be telescopically received therein and to cooperate with the axially spaced wall segments to guide the ends of the split ring into axially aligned abutment when seated in the piston ring. Also, means formed on the accessory member cooperate with the radially spaced wall segments of the channel to normally retard relative telescopic movement between the member and the ring, for retaining the ends of the ring in a prepositioned, spaced-apart relationship against inherent resilient forces of the ring tending to close the gap between the ends, and to enable snap-skip movement when a greater force is applied to the ring for closing the gap to seat the same in a ring groove.

Although various minor modifications might be suggested by those versed in the art, it should be understood that I wish to embody within the scope of the patent warranted hereon all such modifications as reasonably and properly come within the scope of my contribution to the art.

We claim as our invention:

1. An end alignment and gap spacing device for use with a split piston ring of the expander-spacer type having a circumferentially extending channel formed between radially spaced, axially extending, inner and outer wall portions and opening at ends of the split ring, said device comprising: an elongated, one-piece member having a cross sectional configuration sized and shaped to be telescopically received in a circumferentially extending channel of a piston ring and spanning a gap between opposed ends of the ring and including resilient means on said member cooperating with inner and outer, radially spaced, axially extending wall portions forming the ring channel on each side of the split in the ring for retaining ends of the ring is a spaced-apart relationship against circumferentially directed forces generated by an inherent resiliency of the ring when in its expanded position and enabling movement of the ring ends towards each other when a circumferentially directed force greater than the inherent forces is applied to the ring; said resilient means comprising each of the opposite end portions of said member being offset in a direction for cooperating with inner wall portions forming the channel for resiliently urging an outwardly projecting edge surface of the member into frictional engagement with outer wall protions of the channel; and said member having serrations formed on said edge portion for coacting with the outer wall portions to retard relative telescopic movement between said member and the split ring.

2. An end alignement and gap spaceing device for use with a split piston ring of the expander-spacer type having a circumferentially extending channel formed between radially spaced, axially extending, inner and outer wall portions and opening at ends of the split ring, said device comprising: an elongated, one-piece member having a cross sectional configuration sized and shaped to be telescopically received in a circumferentially extending channel of a piston ring and spanning a gap between opposed ends of the ring and including resilient means on said member cooperating with inner and outer, radially spaced, axially extending wall portions forming the ring channel on each side of the split in the ring for retaining the ends of the ring in a spaced-apart relationship against circumferentially directed forces generated by an inherent resiliency of the ring when in its expanded position and enabling movement of the ring ends towards each other when a circumferentially directed force greater than the inherent forces is applied to the ring; said resilient means comprising at least one end portion of said elongated member being reversely bent and formed with a pair of diverging leg segments joined at an apex spaced outwardly of said member a distance greater than the spacing between inner and outer, radially spaced wall portions forming the ring channel, whereby said diverging, resilient legs form a wedge resiliently urging said apex into frictional engagement with one of the inner and outer wall portions for retarding telescopic movement of the member relative to the ring.

3. An end alignment and gap spacing device for use with a split piston ring of the expander-spacer type having a circumferentially extending channel formed between radially spaced, axially extending, inner and outer wall portions and opening at ends of the split ring, said device comprising: an elongated, one-piece member having a cross sectional configuration sized and shaped to be telescopically received in a circumferentially extending channel of a piston ring and spanning a gap between opposed ends of the ring and including resilient means on said member cooperating with inner and outer, radially spaced, axially extending wall portions forming the ring channel on each side of the split in the ring for retaining the ends of the ring in a spaced-apart relationship against circumferentially directed forces generated by an inherent resiliency of the ring when in its expanded position and enabling movement of the ring ends towards each other when a circumferentially directed force greater than the inherent forces is applied to the ring; said resilient means comprising at least one end of said member being offset to form a spring arm and having a distal end curled to form an arcuate abutment surface spaced from said member a distance greater than the spacing between the inner and outer radially spaced wall portions forming the ring channel, whereby said arcuate abutment surface will be urged into engagement with one of the inner and outer wall portions by said spring arm to retard relative telescoping movement between said member and the ring.

* * * * *